(12) United States Patent
Posthumus

(10) Patent No.: US 11,802,012 B1
(45) Date of Patent: Oct. 31, 2023

(54) DELIVERY BOX SYSTEM AND METHOD

(71) Applicant: Rein Posthumus, Stephenville, TX (US)

(72) Inventor: Rein Posthumus, Stephenville, TX (US)

( * ) Notice: Subject to any disclaimer, the term of this patent is extended or adjusted under 35 U.S.C. 154(b) by 624 days.

(21) Appl. No.: 16/405,012

(22) Filed: May 7, 2019

Related U.S. Application Data

(60) Provisional application No. 62/668,683, filed on May 8, 2018.

(51) Int. Cl.
*B65G 67/24* (2006.01)
*B65G 19/00* (2006.01)
*B65G 3/00* (2006.01)
*B65G 47/16* (2006.01)
*B01F 35/12* (2022.01)
*B01F 35/71* (2022.01)

(52) U.S. Cl.
CPC ............. *B65G 67/24* (2013.01); *B65G 19/00* (2013.01); *B01F 35/12* (2022.01); *B01F 35/71705* (2022.01); *B65G 3/00* (2013.01); *B65G 47/16* (2013.01)

(58) Field of Classification Search
CPC . B65G 67/24; B65G 47/16; B01F 2015/0204; B01F 15/00038
See application file for complete search history.

(56) References Cited

U.S. PATENT DOCUMENTS

| 2009/0047106 A1* | 2/2009 | Ash | B65G 67/24 414/809 |
| 2016/0360704 A1* | 12/2016 | Kringstad | A01D 90/10 |
| 2017/0057762 A1* | 3/2017 | Renyer | B65G 41/002 |

\* cited by examiner

*Primary Examiner* — Saul Rodriguez
*Assistant Examiner* — Willie W Berry, Jr.
(74) *Attorney, Agent, or Firm* — Foley & Lardner LLP

(57) ABSTRACT

According to embodiments disclosed herein, there is provided a delivery box system to deliver a commodity material. In various instances, a single auger configuration, a dual auger configuration, a vertical auger configuration and/or further configurations or combinations of configurations are contemplated as described. One or more auger facilitates the metered release of the commodity material and ameliorates jamming of the commodity material against aspects of the delivery box system.

17 Claims, 8 Drawing Sheets

DELIVERY BOX SYSTEM AND METHOD

CROSS-REFERENCE TO RELATED APPLICATIONS

This application claims the benefit of and priority to U.S. Prov. Pat. App. No. 62/668,683, filed on May 8, 2018, and entitled "DELIVERY BOX SYSTEM AND METHOD," the disclosure of which is hereby incorporated by reference in its entirety.

TECHNICAL FIELD

This disclosure relates to delivery boxes, and in particular, to a system and method for efficiently transporting and unloading commodities such as animal feeds from a delivery box.

BACKGROUND OF THE DISCLOSURE

Commodity transportation vehicles having delivery boxes are frequently implemented to release contained commodities in a controlled way, such as to release animal feed constituents. However, challenges are associated with such delivery boxes in connection with different commodity types. For instance, various commodities are prone to jamming or otherwise occluding the passage out from the delivery box, impeding effective and controlled delivery of the commodities being released. Moreover, frequent challenges arise with adapting delivery boxes for use with different commodities having different material properties. For example, long commodities such as hay may behave differently in bulk than short commodities such as seeds. Thus, there is a further jamming and occlusion challenge arising from processing varied commodities by the commodity transportation vehicle having the delivery box as well as operational efficiency challenges associated with changing the delivery box or aspects thereof in connection with changing the type of commodity being handled.

SUMMARY

In a first aspect, there is provided a system for commodity delivery from a delivery box system.

In a second aspect, there is provided a method for commodity delivery from a delivery box system.

Other aspects, features, and advantages will become apparent from the following detailed description when taken in conjunction with the accompanying drawings, which are part of this disclosure and which illustrate, by way of example, principles of the inventions disclosed.

A delivery box system is provided. The delivery box system may include a translation mechanism configured to mechanically move a stored commodity material within a delivery box toward at least one of an expulsion mechanism and a metering aperture mechanism. The system may include the expulsion mechanism configured to mechanically release stored commodity material from the delivery box through the metering aperture mechanism. Finally, the system may include the metering aperture mechanism including a controllable aperture through which commodity material mechanically released from the delivery box passes.

In various instances, the translation mechanism includes a longitudinal translator including a longitudinally oriented conveyor belt disposed along a floor of the delivery box, and a lateral translator including a laterally oriented conveyor belt disposed along the floor of the delivery box at an end of the longitudinally oriented conveyor belt.

Furthermore, in various embodiments, the expulsion mechanism includes an agitation mechanism, an expulsion effector, and an adjustable cavity guard. The agitation mechanism may be configured to regulate a feeding of commodity material moved by the translation mechanism toward the expulsion mechanism. The agitation mechanism may include aa upper mixer extending across at least a portion of the delivery box and a lower mixer extending across at least the portion of the delivery box and closer to the translation mechanism than the upper mixer. The expulsion effector may include an auger set. The adjustable cavity guard may include a slidable impingement plate proximate to at least a portion of the auger set and slidably adjustable in position relative to the auger set.

The expulsion mechanism may include an expulsion effector including an auger set, the auger set including a single horizontal auger oriented normal to an aperture of a metering aperture mechanism and configured to impel commodity material toward the metering aperture mechanism.

The expulsion mechanism may include an expulsion effector including an auger set, the auger set including further aspects. For instance, the auger set may include at least one primary flow horizontal auger oriented normal to an aperture of a metering aperture mechanism and configured to impel commodity material toward the metering aperture mechanism. The auger set may include at least one reciprocal flow horizontal auger oriented normal to the aperture of the metering aperture mechanism and configured to impel commodity material away from the metering aperture mechanism. The at least one primary flow horizontal auger and the at least one reciprocal flow horizontal auger may operate simultaneously to ameliorate jamming of commodity material against a door of the metering aperture mechanism.

Moreover, the translation mechanism may include a longitudinal translator including a longitudinally oriented conveyor belt disposed along a floor of the delivery box, and a lateral translator including an auger flow channel including a curved surface of a delivery box corresponding in shape to one of the at least one primary flow horizontal auger and spaced apart from the at least one primary flow horizontal auger a distance including a clearance spacing.

In particular embodiments the one of the at least one primary flow horizontal auger is movable to change the clearance spacing.

In various instances, the expulsion mechanism has an expulsion effector including an auger set, the auger set including a single horizontal auger positioned above the lateral conveyor.

Furthermore the expulsion mechanism may include comprises an expulsion effector including an auger set, the auger set including a single vertical auger positioned above the lateral conveyor.

Also provided is a method of providing a delivery box system comprising providing aspects of the system discussed above.

Finally, there is provided a method of commodity delivery from a delivery box system. The method may include rotating in a first direction at least one primary flow horizontal auger oriented normal to an aperture of a metering aperture mechanism. The method may include impelling commodity material toward the metering aperture mechanism by the at least one primary flow horizontal auger in response to the rotating in the first direction. The method may also include rotating in a second direction at least one reciprocal flow horizontal auger oriented normal to the aperture of the metering aperture mechanism. Finally, the method may include impelling commodity material away from the metering aperture mechanism by the at least one reciprocal flow horizontal auger in response to the rotating in the second direction. In various instances, the at least one primary flow horizontal auger and the at least one reciprocal flow horizontal auger operate simultaneously to ameliorate jamming of commodity material against a door of the metering aperture mechanism. In various instances the first direction and the second direction are a same rotational direction.

DESCRIPTION OF THE FIGURES

The accompanying drawings facilitate an understanding of the various embodiments.

DETAILED DESCRIPTION

Frequently, delivery boxes are implemented to transport and deliver commodity materials, such as agricultural feed. Embodiments of a delivery box system are disclosed herein that are configured to feed out the commodity material with improved regularity and metering. Furthermore, challenges are addressed including that of feed bridging in crossfeed modes, overloading of commodity material in a crossfeed aspect of a delivery box system, such as an area configured to facilitate expulsion of the commodity material from the delivery box, and the like. In various embodiments, one or more auger is incorporated in the delivery box system, such as to impel the commodity material from the delivery box system. In yet further instances, one or more additional auger further impels the commodity material inwardly into the delivery box system, such as counter to the direction of expulsion of the commodity material from the delivery box, such as to ameliorate jamming of commodity material, to ameliorate filling of the commodity material into voids facilitating operation of moving components, and further manage instantaneous material weight of commodities on various delivery box system mechanisms.

Furthermore, in various disclosed embodiments, one or more auger is movable, selectably positionable to accommodate commodities of different compositions. For example, shorter/finer commodities may involve the one or more auger positioned close to a side of the delivery box, whereas longer/coarser commodities may involve the one or more auger being positioned farther from a side of the delivery box.

Yet further, a combination of aspects of the delivery box system, such as the cooperation of expulsion mechanisms and translation mechanisms as discussed herein facilitates management of drag during operation and during startup on moving components.

Still furthermore, in various disclosed instances, the implementation of multiple augers impelling the commodity material in opposing direction further facilitates an upper auger directing commodity toward a bottom auger in a regulated fashion and a bottom auger feeding commodity out from the delivery box system, so that metering of the expulsion of the commodity material is enhanced. In various scenarios such a top auger keeps feed suspended above bottom auger and keeps bottom auger full to a desired quantity of commodity for consistent flow rate and volume of commodity. Moreover, one or more such auger may be adjustable in response to a measured weight and/or volume of feed transiting the crossfeed aspect, whereby consistent measured weight and/or volume is maintainable over time.

Furthermore, it should be understood that delivery box system is not so limited to commodities to create feed for livestock or other animals. Indeed, delivery box systems may be used for any type of material, such as, for example, construction aggregates.

Figure 1:
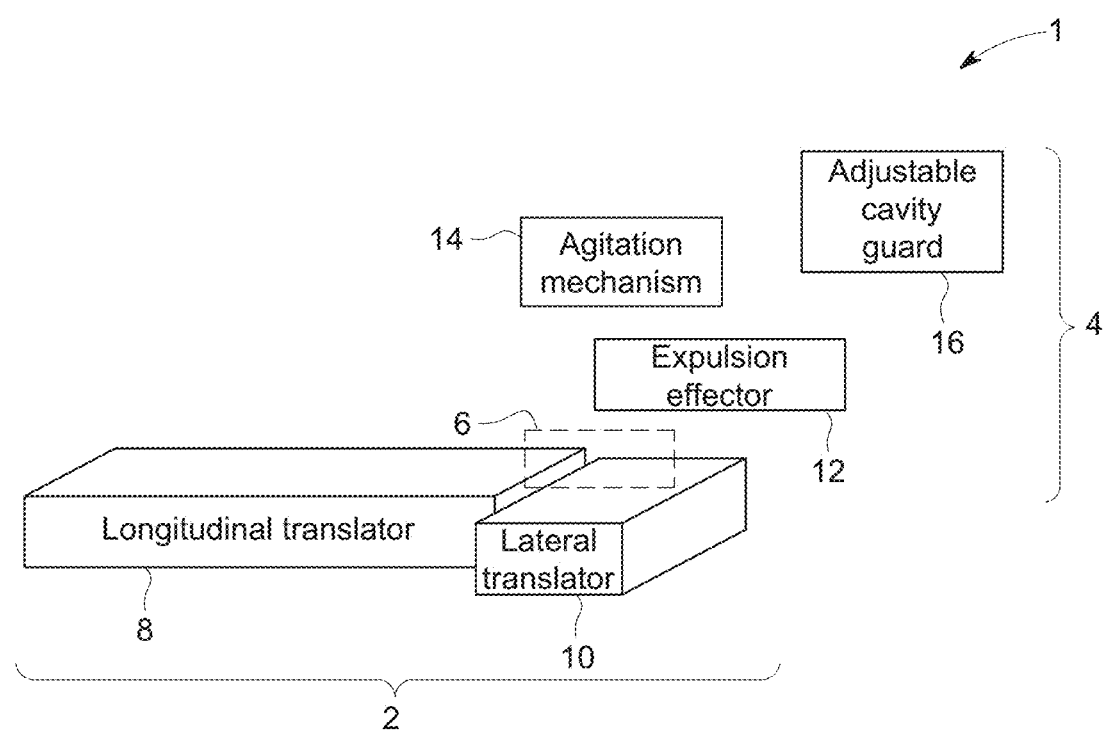
FIG. 1 is a block diagram of an example delivery box, in accordance with various embodiments.
Figure 2:
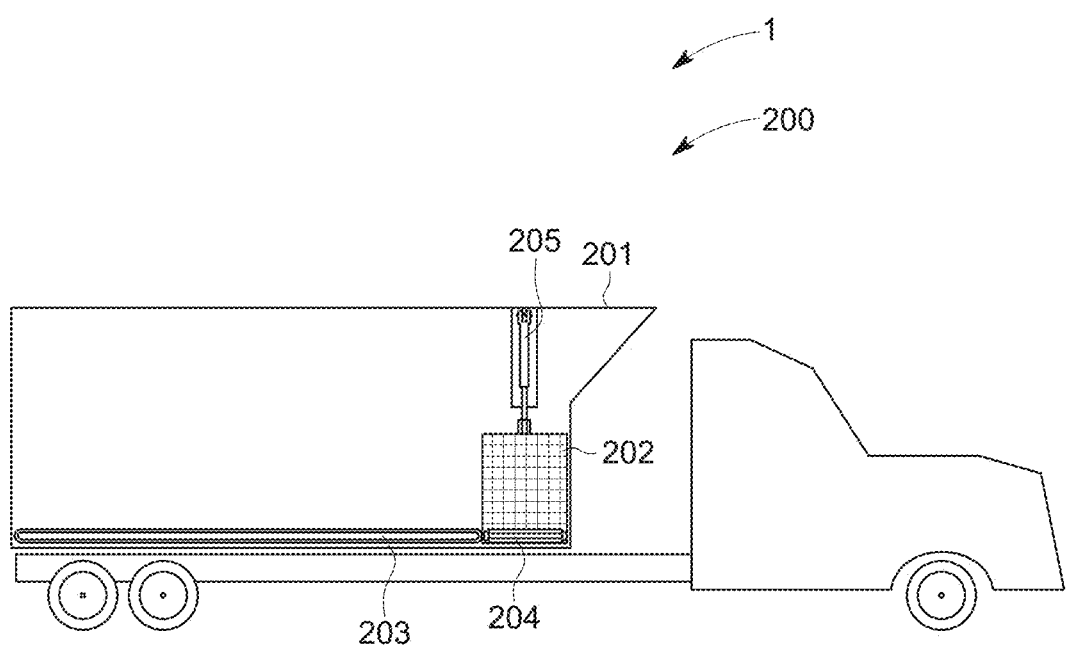
FIG. 2 is a side view of an example delivery box showing a delivery door, in accordance with various embodiments.
Figure 3A:
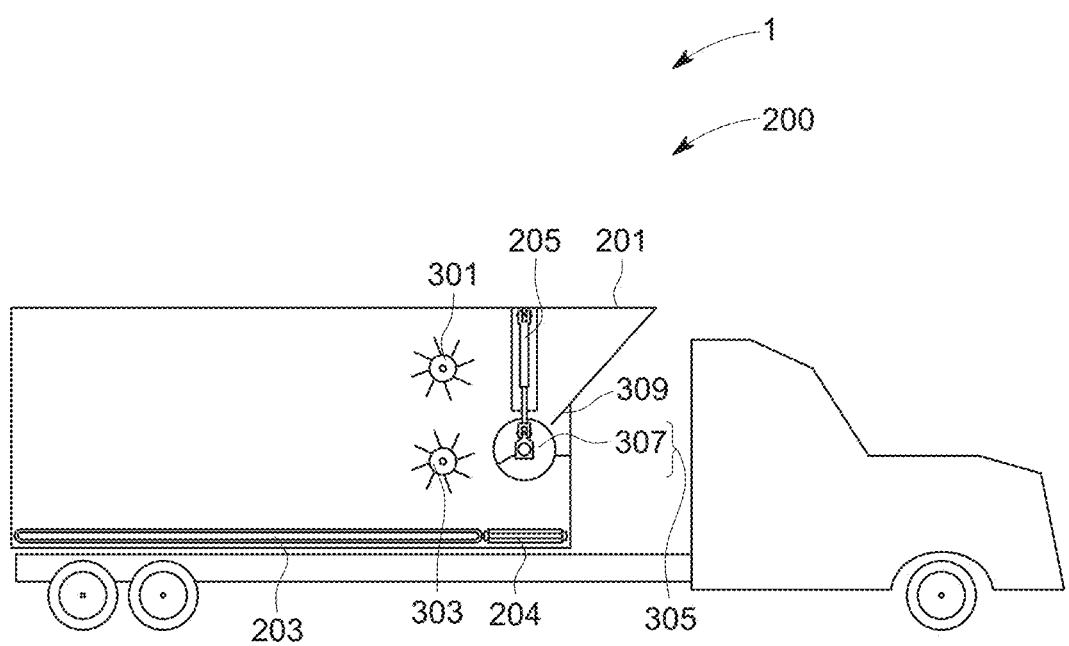
FIG. 3A is a side view of an example delivery box showing internal aspects including a single horizontal auger and without a commodity therein, in accordance with various embodiments.
Figure 3B:
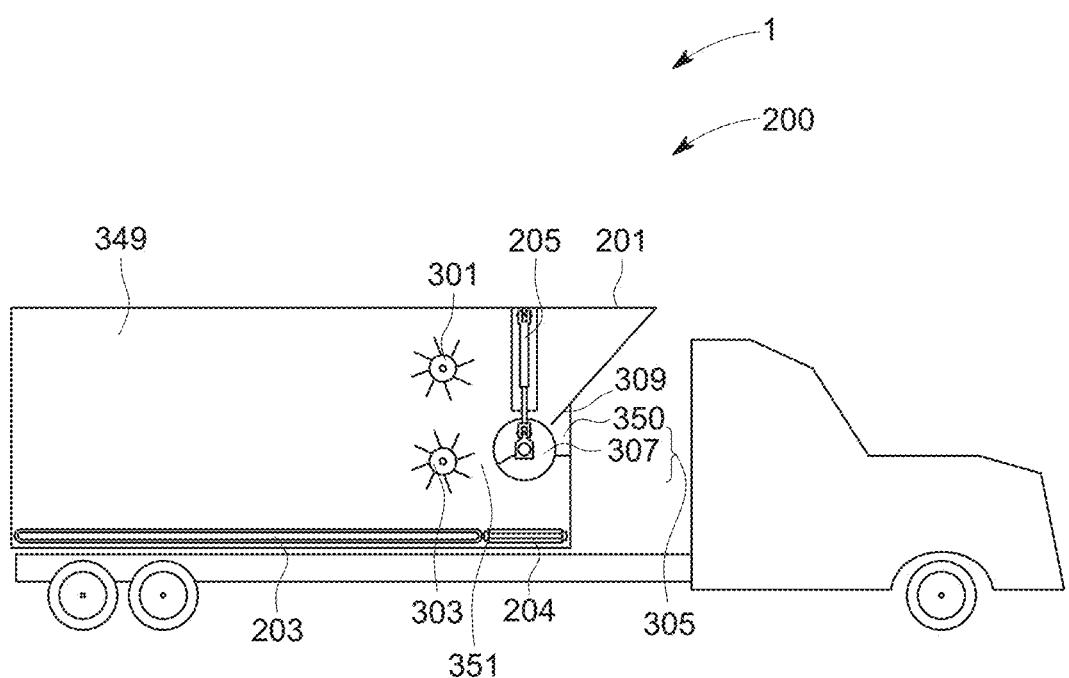
FIG. 3B is a side view of an example delivery box showing internal aspects including a single horizontal auger, and with a commodity therein, in accordance with various embodiments.
Figure 4A:
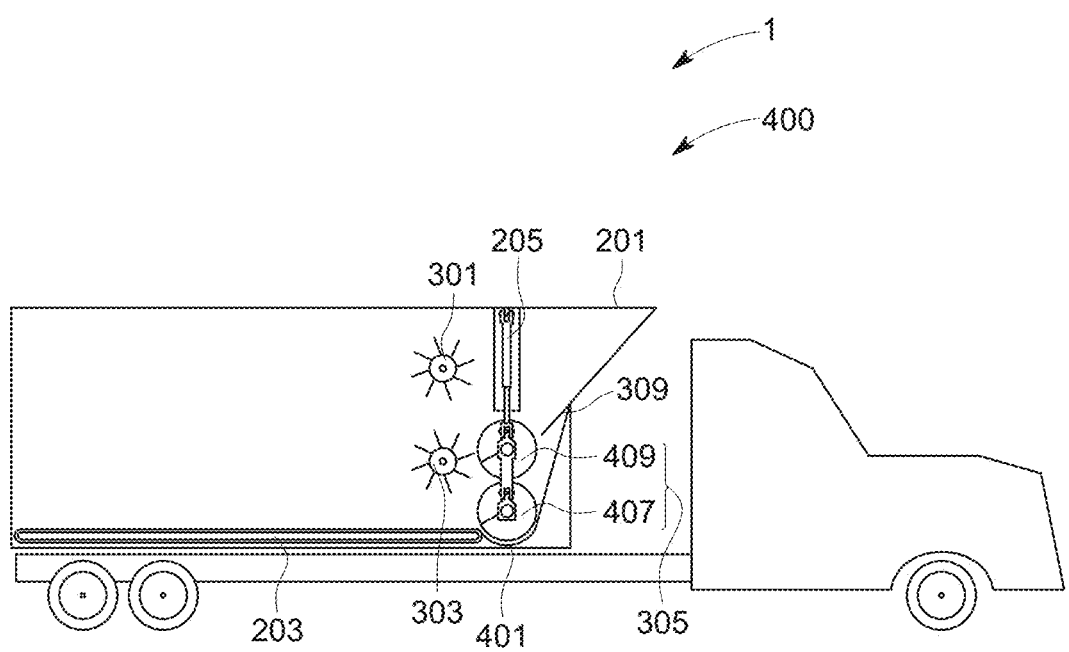
FIG. 4A is a side view of an example delivery box showing internal aspects including a double horizontal auger and without a commodity therein, in accordance with various embodiments.
Figure 4B:
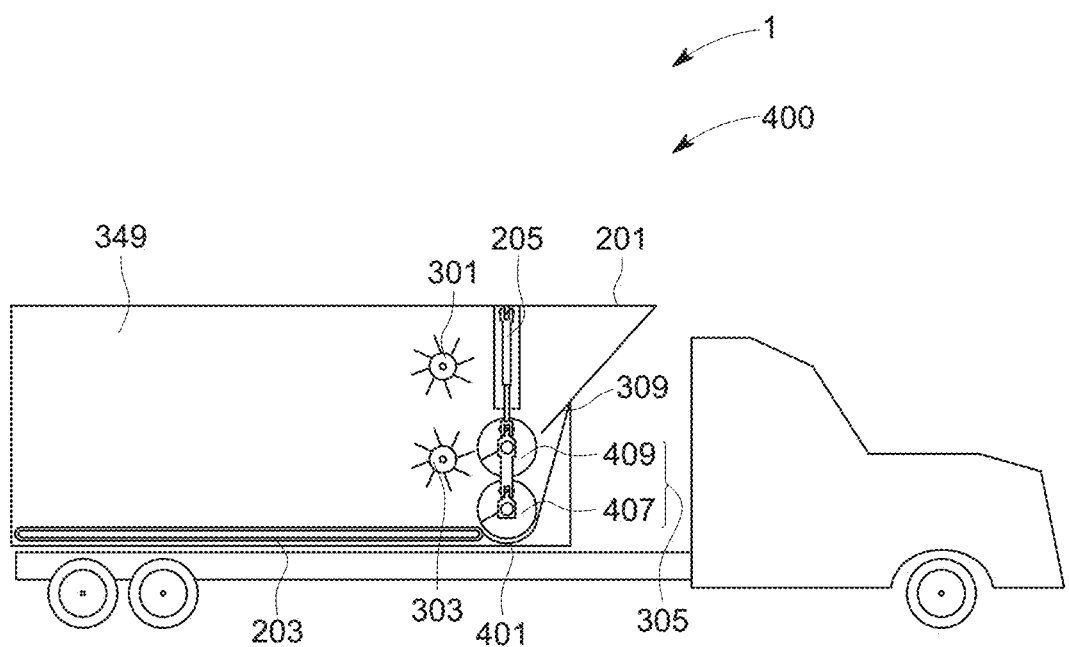
FIG. 4B is a side view of an example delivery box showing internal aspects including a double horizontal auger, and with a commodity therein, in accordance with various embodiments.
Figure 5:
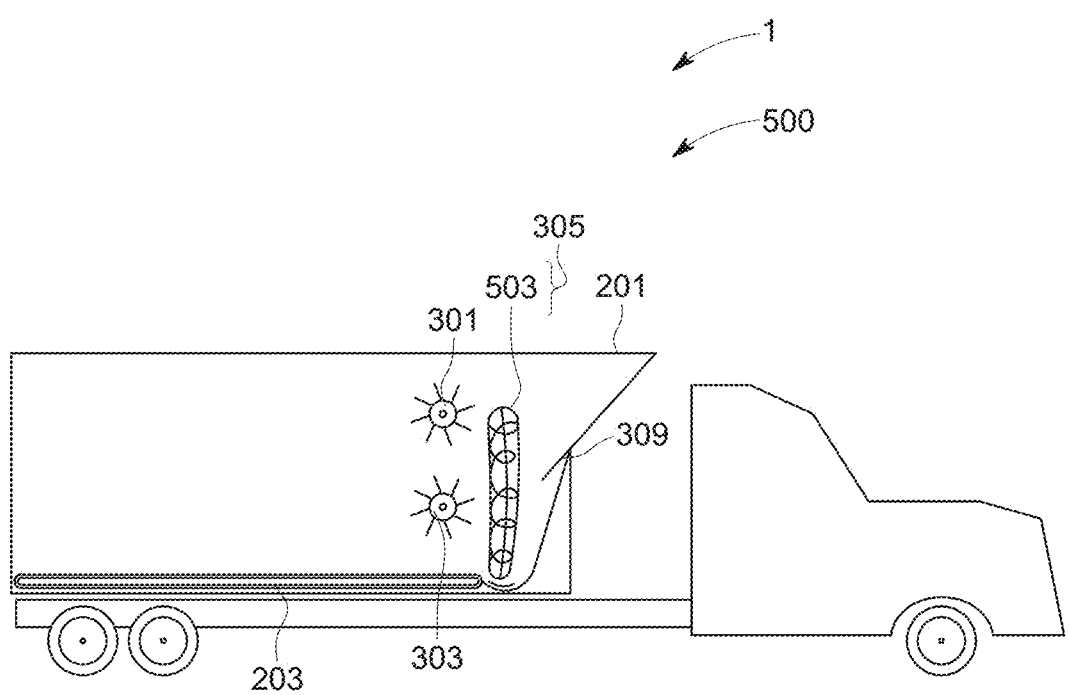
FIG. 5 is a side view of an example delivery box showing internal aspects including at least one vertical auger and without a commodity therein, in accordance with various embodiments.

With reference to FIGS. 1-5, various embodiments of a delivery box system 1 are depicted. For example, a delivery box system 1 may include a single flow direction auger configuration 200, which is depicted in FIGS. 3A-B with a single auger, although multiple augers feeding commodity material in a same direction may be implemented. A delivery box system 1 may include a dual flow direction auger configuration 400, which is depicted in FIGS. 4A-B with two augers, although multiple augers feeding commodity material in different direction may be implemented. A delivery box system 1 may include a vertical auger configuration 500, which is depicted in FIG. 5 with a single vertical auger, though multiple augers feeding commodity in a same direction or in differing directions may be contemplated.

Single Auger Configuration

Focusing specifically on a delivery box system of a single auger configuration 200, attention is directed to FIGS. 1, 2, 3A-B. In various instances, a delivery box system 1, and particularly, a delivery box system having a single auger configuration 200 may include numerous aspects, some of which are similarly shared with the dual auger configuration 400 (FIG. 4A-B), some of which are similarly shared with the vertical auger configuration 500 (FIG. 5) and some of which are unique to the single auger configuration 200.

For example, the delivery box system 1 with a single auger configuration 200 may include a delivery box 201. A delivery box 201 may comprise a storage compartment of a truck. In further embodiments, a delivery box 201 may comprise a storage compartment of a trailer. Moreover, a delivery box 201 may comprise a storage compartment of a train, a boat, a shipping container, and or any other structure configured to retain bulk commodity products as desired.

For instance, in various instances a delivery box 201 may comprise a mixing tub of an agricultural feed mixing barn system.

The delivery box system 1 with a single auger configuration 200 may also include a translation mechanism 2. The translation mechanism 2 may include aspects configured to mechanically move stored commodity material within the delivery box 201 and facilitate ejection of the commodity material within the delivery box 201 from the delivery box 201 by an expulsion mechanism 4. The translation mechanism 2 may be configured to mechanically move stored commodity material within the delivery box 201 toward at least one of an expulsion mechanism and a metering aperture mechanism. In various instances, the translation mechanism 2 may include conveyors, rakes, paddles, augers, blades, and/or any mechanism configured to impart mechanical motion, as desired.

The delivery box system 1 with a single auger configuration 200 may also include an expulsion mechanism 4, as mentioned above. The expulsion mechanism may include aspects configured to mechanically release stored commodity material from the delivery box 201 such as into a reservoir or other container, onto the ground such as for livestock feeding, and/or the like. In various instances the expulsion mechanism 4 is configured to interoperate with a metering aperture mechanism 6 and a translation mechanism 2 to provide for a controlled release of a defined quantity of commodity material at a defined rate. In this manner, the release of commodity material may proceed predictably and reliably according to known metrics.

The delivery box system 1 with a single auger configuration 200 may also include a metering aperture mechanism 6. A metering aperture mechanism 6 comprises a controllable aperture through which commodity material being released from the delivery box 201 passes. For example, a metering aperture mechanism 6 may comprise a hole and door wherein the door is movable to change the size of the aperture of the hole. In this manner, the exit of commodity material from the delivery box 201 may in various instances be metered by the translation mechanism 2 and the expulsion mechanism 4 while in further instances may be metered by the metering aperture mechanism 6 and/or a combination of the translation mechanism 2, expulsion mechanism 4, and metering aperture mechanism 6.

The delivery box system 1 with a single auger configuration 200 may also include included commodity material 349 stored therein. In various instances, the expulsion mechanism 4 and metering aperture mechanism 6 interoperate to create voids in the commodity material 249 that facilitate improved metering of a defined quantity of commodity material at a defined rate as the metered commodity material exits the delivery box system 1. For example, a lower mixer void 351 and an adjustable cavity guard void 350 as depicted in FIG. 3B may be established.

Having generally discussed aspects of the delivery box system 1 with a single auger configuration 200, attention is now directed to particular features or sets of features of each of the aspects of the delivery box system 1 with a single auger configuration 200 mentioned above. For example, the translation mechanism 2 may have further features. In various embodiments, the translation mechanism 2 includes a longitudinal translator 8. The longitudinal translator 8 may comprise an apparatus configured to convey bulk commodity material 349 forward or aftward along a longer axis of a delivery box 201. In further instances, the longitudinal translator 8 may comprise an apparatus configured to convey bulk commodity material 349 toward or away from the expulsion mechanism 4. For instance, various delivery box systems 1 may not have a longer axis, for instance, due to having a square or other shape. IN such instance, the longitudinal translator 8 conveys the bulk commodity material 349 toward or away from the expulsion mechanism 4 although the delivery box 201 cannot be said to have a longer axis.

The longitudinal translator 8 may be selectably controlled to establish a feed rate for the expulsion mechanism 4. For instance, a speed, acceleration, and/or volume of material translated over a period of time may be controllably selected. In various embodiments, the longitudinal translator 8 comprises a longitudinal conveyor 203 extending over one or more rollers whereby bulk commodity material 349 resting on the longitudinal conveyor 203 is driven toward an expulsion mechanism 4.

The translation mechanism 2 may also include a lateral translator 10. A lateral translator may comprise an apparatus configured to convey bulk commodity material 349 under the influence of the expulsion mechanism 4 toward a metering aperture mechanism 6. In this manner, the metering of the expulsion of the bulk commodity material 349 may be further improved. For example, bulk commodity material 349 may be placed on the lateral translator 10 by the expulsion mechanism 4 for translation to and through the metering aperture mechanism 6. The lateral translator may comprise an apparatus configured to convey bulk commodity material 349 laterally along a shorter axis of a delivery box 201. In further instances, the lateral translator 10 may comprise an apparatus configured to convey bulk commodity material 349 toward or away from the metering aperture mechanism 6. For instance, various delivery box systems 1 may not have a longer and/or shorter axis, for instance, due to having a square or other shape.

The lateral translator 10 may be selectably controlled to establish a feed rate for the metering aperture mechanism 6. For instance, a speed, acceleration and/or volume of material translated over a period of time may be controllably selected. In various embodiments, the lateral translator 10 comprises a lateral conveyor 204 extending over one or more rollers whereby bulk commodity material 349 resting on the lateral conveyor 204 is driven toward the metering aperture mechanism 6.

Having completed the discussion of the translation mechanism, attention is now focused on the expulsion mechanism 4 of the delivery box system 1 with a single auger configuration 200. The expulsion mechanism comprises various sub components. For example, the expulsion mechanism may comprise an agitation mechanism 14, an expulsion effector 12, and an adjustable cavity guard 16.

An agitation mechanism 14 includes any feature configured to regulate the feeding of commodity material 349 moved by the translation mechanism 2 toward the expulsion mechanism 4 (such as moved proximate to the lateral translator 10 by the longitudinal translator 8) into the expulsion effector 12 of the expulsion mechanism 4. For example, an agitation mechanism 14 may sculpt and direct an upper portion of a pile of commodity material 349 to ameliorate cascading or avalanche-like behavior of the pile which may cause jamming of the expulsion mechanism 4 and/or the metering aperture mechanism 6.

An expulsion effector 12 may comprise any feature configured to regulate the feeding of commodity material 349 thru the metering aperture mechanism 6. For instance, in various embodiments, the expulsion effector 12 comprises an auger set 305. An auger set 305 may include one auger or multiple augers oriented in a horizontal or vertical configuration. The auger set 305 will be discussed in more detail below.

Finally, the expulsion mechanism 4 may include an adjustable cavity guard 16. The adjustable cavity guard 16 may comprise a mechanism structure to ameliorate cascading and/or filling in of commodity material 349 into a space proximate to the expulsion effector 12 and facilitating free movement and operation of the expulsion effector 12. For example, the adjustable cavity guard 16 may comprise a slidable impingement plate 309 which will also be discussed in more detail below.

Now having completed a discussion of the features of an expulsion mechanism 4 of a delivery box system 1 with a single auger configuration 200, specific attention is directed to the features of the metering aperture mechanism 6 of the delivery box system 1 with a single auger configuration 200. In various embodiments, the metering aperture mechanism 67 comprises a door 202 and an actuator 205. An actuator 205 may be connected between the door 202 and the delivery box 201 and may be operable to translate the door 202. In this manner, the translation of the door 202 may control the size and/or shape of an aperture through the delivery box 201 permitting the commodity material 349 to exit the delivery box 201 under the influence of the expulsion mechanism 4 and/or translation mechanism 2. In various embodiments the actuator 205 comprises a hydraulic ram, although in further embodiments, the actuator 205 may comprise any linear actuator, such as an electrical linear actuator, or may comprise any rotary actuator, such as an electric motor, or may comprise any actuator as desired. Furthermore, the door 202 may comprise a plate connectable to the actuator 205 and slidably retainable by rails, or hingeably retainable by hinges, or may comprise any arbitrary shape retained by any retention mechanism as desired.

Attention is now directed to specific features of the agitation mechanism 14. In various embodiments, the agitation mechanism 14 includes both an upper mixer 301 and a lower mixer 303.

The upper mixer 301 may comprise an agitator, such as one or more paddles, blades, arms, wheels, fans, and/or any other mechanism configured to agitate, separate, stir or otherwise move commodity material. The upper mixer 301 may be positioned proximate to an end of the longitudinal translator 8 nearest the lateral translator 10. The upper mixer 301 may be proximate to end of the translation mechanism 2 closest to the expulsion mechanism 4. The upper mixer 301 may extend transversely across the delivery box 201 perpendicular or diagonal to the direction of motion of the longitudinal translator 8. Thus the upper mixer 301 may rotate to impel commodity material along with the motion of the longitudinal translator 8 or against the motion of the longitudinal translator 8.

Similarly, the lower mixer 303 may comprise an agitator, such as one or more paddles, blades, arms, wheels, fans, and/or any other mechanism configured to agitate, separate, stir or otherwise move commodity material. The lower mixer 303 may be positioned proximate to an end of the longitudinal translator 8 nearest the lateral translator 10. The lower mixer 303 may be proximate to end of the translation mechanism 2 closest to the expulsion mechanism 4. The lower mixer 303 may extend transversely across the delivery box 201 perpendicular or diagonal to the direction of motion of the longitudinal translator 8. Thus the lower mixer 303 may rotate to impel commodity material along with the motion of the longitudinal translator 8 or against the motion of the longitudinal translator 8.

In various embodiments, the lower mixer 303 is closer than the upper mixer 305 to the floor of the delivery box 201, such as closer to the translation mechanism 2 and/or expulsion mechanism 4, whereas the upper mixer 305 is closer than the lower mixer 303 to the top of the delivery box 201, such as farther from the translation mechanism 2 and/or expulsion mechanism 4.

As mentioned, the expulsion effector 12 may include an auger set 305. An auger set 305 may comprise any number of augers oriented in any orientation and spinning in any direction as desired. For example, a single horizontal auger 307 may be implemented as shown in FIGS. 3A-B. The single horizontal auger 307 may be oriented normal to aperture of the metering aperture mechanism 6 for instance, normal to the door 202 such that the auger impels commodity material 349 toward or away from the metering aperture mechanism 6.

Finally, the adjustable cavity guard 16 may comprise a slidable impingement plate 309. A slidable impingement plat 309 may comprise a plate positioned proximate to at least a portion of the auger set 305. For instance, the slidable impingement plate 309 may be positioned on the opposite side of the auger set 305 relative to stored commodity material 359 within the delivery box 201. In various instances, during operation of the auger set 305, the slidable impingement plate 309 provides a barrier for at least a portion of commodity material 349 interacting with the auger set 305 such as to prevent at least a portion of the commodity material 349 from engulfing the auger set 305. As such, the adjustable cavity guard void 350 may be established in the commodity material 349 to facilitate amelioration of jamming of the expulsion mechanism 4 and/or metering aperture mechanism 6. In various embodiments, the slidable impingement plate 309 is selectably slidable nearer and farther from the auger set 305 such as to facilitate different commodity materials, such as long commodities such as hay, or short commodities such as seeds.

Dual Auger Configuration

With reference now to FIGS. 1, 2, and 4A-B, a delivery box system 1 having a dual auger configuration 400 is provided. For the sake of brevity, like numbered aspects of the delivery box system 1 having a dual auger configuration 400 that are already discussed above with respect to the single auger configuration 200 (FIGS. 1, 2, and 3A-B) are not repeated below.

However, further aspects of the delivery box system 1 having a dual auger configuration 400 vary from those discussed above and are now detailed with reference to FIGS. 1, 2, and 4A-B.

For instance, the delivery box system 1 having a dual auger configuration 400 comprises a lateral translator 10 which comprises an auger flow channel 401. Rather than a lateral conveyor 204 (FIG. 3A-B), an auger flow channel 401 is implemented as an aspect of a lateral translator 10.

The lateral translator may comprise an apparatus configured to convey bulk commodity material 349 under the influence of the expulsion mechanism 4 toward a metering aperture mechanism 6. In this manner, the metering of the expulsion of the bulk commodity material 349 may be further improved. For example, bulk commodity material 349 may be placed on/in the lateral translator 10 by the expulsion mechanism 4 for translation to and through the metering aperture mechanism 6. The lateral translator may comprise an apparatus configured to convey bulk commodity material 349 laterally along a shorter axis of a delivery box 201. In further instances, the lateral translator 10 may comprise an apparatus configured to convey bulk commodity material 349 toward or away from the metering aperture mechanism 6. For instance, various delivery box systems 1 may not have a longer and/or shorter axis, for instance, due to having a square or other shape.

The lateral translator 10 may be selectably controlled to establish a feed rate for the metering aperture mechanism 6. For instance, a speed, acceleration and/or volume of material translated over a period of time may be controllably selected. The lateral translator 10 comprises an auger flow channel 401 which interoperates with the expulsion mechanism 4 to guide bulk commodity material 349 captured by the combination of the expulsion mechanism 4 and the auger flow channel 401 toward the metering aperture mechanism 6.

The expulsion mechanism 4 may thus be selectably controlled to establish a feed rate for the metering aperture mechanism 6 in embodiments with an auger flow channel 401. For instance, a speed, acceleration and/or volume of material translated over a period of time may be controllably selected.

In various embodiments, the auger flow channel 401 comprises a curved surface of a delivery box 201 corresponding to a profile of an auger of the expulsion mechanism 4. A clearance spacing between the auger of the expulsion mechanism 4 and the auger flow channel 401 may be selected, such as by operation of a mechanism to adjust the position of the expulsion mechanism 4. In this manner, different types of commodity material may be accommodated.

Additionally, the auger set 305 may comprise various aspects that vary from those discussed with reference to the single auger configuration 200 (FIGS. 3A-B). For instance, an auger set 305 may comprise a primary flow horizontal auger 407 and a reciprocal flow horizontal auger 409. A primary flow horizontal auger may comprise an auger positioned to direct commodity material 349 toward a metering aperture mechanism 6. A reciprocal flow horizontal auger 409 may be an auger positioned to direct commodity material 349 away from a metering aperture mechanism 6. The primary flow horizontal auger 407 and the reciprocal flow horizontal auger 409 may be positioned where their central rotational axes are parallel. The primary flow horizontal auger 407 and the reciprocal flow horizontal auger 409 may be oriented in a stacked relation so that gravity influences the movement of commodity material 349 along a vector joining the primary flow horizontal auger 407 and the reciprocal flow horizontal auger 409. Thus, one may appreciate that the reciprocal flow horizontal auger 409 may be positioned above (relative to gravity) the primary flow horizontal auger 407 such that the bulk commodity material 349 is agitated and jamming of the primary flow horizontal auger 407 is ameliorated and the flow of bulk commodity material 349 feeding the primary flow horizontal auger 407 rendered more even. In such an instance, the adjustable cavity guard 16 comprising a slidable impingement plate 309 may be oriented proximate to the reciprocal flow horizontal auger 409, though in further embodiments, orientation proximate to the primary flow horizontal auger 407 is also contemplated. Furthermore, FIG. 4B illustrates an adjustable cavity guard void 350 in the commodity material 349, but notably the lower mixer void 351 (FIG. 3B) may in some embodiments be eliminated, such as due to the beneficial flow metering and jamming amelioration effects of the described auger set 305 having a primary flow horizontal auger 407 and a reciprocal flow horizontal auger 409.

Vertical Auger Configuration

Various aspects of different delivery box system 1 embodiments having different auger configurations have been discussed, however, a further aspect of a single auger configuration 200 (FIG. 3A-B) or a dual auger configuration 400 (FIG. 4A-B), or any further configuration contemplated may also include an different orientation of the single, dual, or any number of augers. Thus, with reference to FIGS. 1, 2 and 5, a vertical auger configuration 500 is shown. While a single, vertically oriented auger (single vertical auger 503) of an auger set 305 is shown, other numbers of augers are also possible, for instance a dual, vertically oriented auger configuration of an auger set 305. The auger set 305 comprising the single vertical auger 503 may also comprise one or more horizontal auger as well, in further embodiments. The single vertical auger 503 may be configured to agitate commodity material, loosening and impelling the commodity material more evenly to flow in a metered way and ameliorate jamming of the commodity material against aspects of a translation mechanism 2, metering aperture mechanism 6 and/or other aspects of the expulsion mechanism 4 in addition to the single vertical auger 503.

Delivery Method(s)

Figure 6:
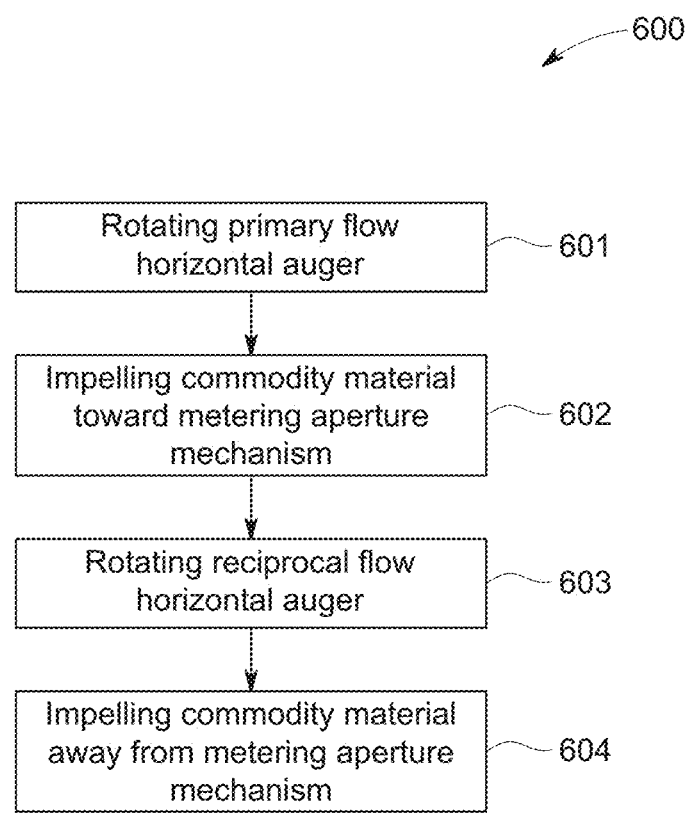
FIG. 6 illustrates a method of commodity delivery from a delivery box system, in accordance with various embodiments.

Finally, and with reference to FIG. 6, a method of commodity delivery is provided. While similar methods may be incorporated with respect to any of the configurations or with respect to combinations of configurations discussed herein, for brevity, a method of commodity delivery contemplating a dual auger configuration 400 (FIG. 4A-B) is discussed, though one may appreciate that similar principles are applicable to single auger configurations 200 (FIG. 3A-B), vertical auger configurations 500 (FIG. 5) or combinations thereof.

A method 600 of commodity delivery from a delivery box system may include various steps. For instance, the method may include rotating in a first direction at least one primary flow horizontal auger oriented normal to an aperture of a metering aperture mechanism (step 601). The method may include impelling commodity material toward the metering aperture mechanism by the at least one primary flow horizontal auger in response to the rotating in the first direction (step 602) Similarly, the method also may include rotating in a second direction at least one reciprocal flow horizontal auger oriented normal to the aperture of the metering aperture mechanism (step 603) and impelling commodity material away from the metering aperture mechanism by the at least one reciprocal flow horizontal auger in response to the rotating in the second direction (step 604).

In various instances, the at least one primary flow horizontal auger and the at least one reciprocal flow horizontal auger operate simultaneously to ameliorate jamming of commodity material against a door of the metering aperture mechanism. Thus one or more step discussed above may occur in simultaneity with one or more other step or steps.

In addition, the first direction and the second direction may be a same rotational direction. In further instances, the first direction and the second direction may be a same rotational direction. Thus the augers may also be similarly handed (left-handed screw or right-handed screw) or may be oppositely handed spirals.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front"

and "rear", "above" and "below" and the like are used as words of convenience to provide reference points and are not to be construed as limiting terms. As used herein, "longitudinal" is intended to mean along a longer axis and "transverse" is intended to mean perpendicular to longitudinal.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Furthermore, invention(s) have been described in connection with what are presently considered to be the most practical and preferred embodiments and it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A delivery box system comprising:
   a translation mechanism configured to mechanically move a stored commodity material within a delivery box toward at least one of an expulsion mechanism and a metering aperture mechanism;
   the expulsion mechanism configured to mechanically release stored commodity material from the delivery box through the metering aperture mechanism; and
   the metering aperture mechanism comprising a controllable aperture through which commodity material mechanically released from the delivery box passes,
   wherein the expulsion mechanism comprises:
      an agitation mechanism to regulate feeding of the stored commodity material moved by the translation mechanism toward the controllable aperture, wherein the agitation mechanism comprises an upper mixer extending across at least a portion of the delivery box and a lower mixer extending across at least a portion of the delivery box and closer to the translation mechanism than the upper mixer;
      an expulsion effector comprising an auger set with at least one auger; and
      an adjustable cavity guard comprising a slidable impingement plate proximate to at least a portion of the auger set and slidably adjustable in position relative to the auger set.

2. The delivery box system of claim 1, wherein the translation mechanism comprises:
   a longitudinally oriented conveyor belt disposed along a floor of the delivery box; and
   a laterally oriented conveyor belt disposed along the floor of the delivery box at an end of the longitudinally oriented conveyor belt.

3. The delivery box system of claim 1, wherein the auger set comprises:
   a single horizontal auger oriented normal to the controllable aperture of the metering aperture mechanism and configured to impel the stored commodity material toward the metering aperture mechanism.

4. The delivery box system of claim 1, wherein the auger set comprises:
   at least one primary flow horizontal auger oriented to the controllable aperture of the metering aperture mechanism so as to impel at least a portion of the stored commodity material toward the metering aperture mechanism;
   at least one reciprocal flow horizontal auger oriented to the controllable aperture of the metering aperture mechanism so as impel at least a portion of the stored commodity material away from the metering aperture mechanism.

5. The delivery box system of claim 4, wherein the at least one primary flow horizontal auger and the at least one reciprocal flow horizontal auger rotate simultaneously to ameliorate jamming of the stored commodity material against a door of the metering aperture mechanism.

6. The delivery box system of claim 1,
   wherein the at least on auger of the auger set comprises:
      at least one primary flow horizontal auger oriented to the controllable aperture of the metering aperture mechanism so as to impel at least a portion of the stored commodity material toward the metering aperture mechanism; and
   wherein the translation mechanism comprises:
      a longitudinally oriented conveyor belt disposed along a floor of the delivery box; and
      an auger flow channel comprising a curved surface of the delivery box corresponding in shape to one of the at least one primary flow horizontal auger and spaced apart from the at least one primary flow horizontal auger a distance to provide a clearance spacing between the at least one primary flow horizontal auger and the curved surface.

7. The delivery box system of claim 6, wherein the at least one primary flow horizontal auger is movable to change the clearance spacing.

8. The delivery box system of claim 1,
   wherein the translation mechanism comprises:
      a longitudinally oriented conveyor belt disposed along a floor of the delivery box; and
      a laterally oriented conveyor belt disposed along the floor of the delivery box at an end of the longitudinally oriented conveyor belt;
   wherein the auger set comprises:
      a single horizontal auger positioned above the laterally oriented conveyor belt.

9. The delivery box system of claim 1,
   wherein the translation mechanism comprises:
      a longitudinally oriented conveyor belt disposed along a floor of the delivery box; and
      a laterally oriented conveyor belt disposed along the floor of the delivery box at an end of the longitudinally oriented conveyor belt;
   wherein the auger set comprises:
      a single vertical auger positioned above the laterally oriented conveyor belt.

10. A delivery box system comprising:
    a longitudinally oriented conveyor belt disposed along a floor of the delivery box; and
    a controllable aperture through which commodity material mechanically released from the delivery box passes;
    at least one primary flow horizontal auger oriented normal to the controllable aperture of a metering aperture mechanism and configured to impel at least a portion of a stored commodity material toward the controllable aperture; and at least one reciprocal flow horizontal auger oriented normal to the controllable aperture of the metering aperture mechanism and configured to impel at least a portion of the stored commodity material away from the metering aperture mechanism.

11. The delivery box system of claim 10, further comprising:

an upper mixer extending across at least a portion of the delivery box; and a lower mixer extending across at least a portion of the delivery box and closer to the longitudinally oriented conveyor belt than the upper mixer.

12. The delivery box system of claim 11, further comprising:

an adjustable cavity guard comprising a slidable impingement plate proximate to the primary flow horizontal auger and slidably adjustable in position relative to the primary flow horizontal auger.

13. A delivery box system comprising:

a longitudinally oriented conveyor belt disposed along a floor of the delivery box;

a laterally oriented conveyor belt disposed along the floor of the delivery box at an end of the longitudinally oriented conveyor belt;

a metering aperture mechanism comprising a controllable aperture through which commodity material mechanically released from the delivery box passes, wherein the size of the aperture may be controlled to meter the expulsion of the commodity material from the delivery box; and at least one primary flow horizontal auger spaced apart from and generally aligned with the laterally oriented conveyer belt and oriented to the controllable aperture of the metering aperture mechanism so as to impel commodity material stored in the delivery box toward the controllable aperture.

14. The delivery box system of claim 13, further comprising:

an adjustable cavity guard comprising a slidable impingement plate proximate to the primary flow horizontal auger and slidably adjustable in position relative to the primary flow horizontal auger.

15. A method of commodity delivery from a delivery box system comprising:

rotating in a first direction at least one primary flow horizontal auger oriented normal to an aperture of a metering aperture mechanism;

impelling commodity material toward the metering aperture mechanism by the at least one primary flow horizontal auger in response to the rotating in the first direction;

rotating in a second direction at least one reciprocal flow horizontal auger oriented normal to the aperture of the metering aperture mechanism; and impelling commodity material away from the metering aperture mechanism by the at least one reciprocal flow horizontal auger in response to the rotating in the second direction, wherein the at least one primary flow horizontal auger and the at least one reciprocal flow horizontal auger operate simultaneously to ameliorate jamming of commodity material against a door of the metering aperture mechanism.

16. The method of claim 15, wherein the first direction and the second direction are a same rotational direction.

17. A method of commodity delivery from a delivery box system comprising:

rotating in a first direction at least one primary flow horizontal auger oriented normal to an aperture of a metering aperture mechanism;

impelling commodity material toward the metering aperture mechanism by the at least one primary flow horizontal auger in response to the rotating in the first direction;

rotating in a second direction at least one reciprocal flow horizontal auger oriented normal to the aperture of the metering aperture mechanism;

impelling commodity material away from the metering aperture mechanism by the at least one reciprocal flow horizontal auger in response to the rotating in the second direction; and translating, in a longitudinal direction perpendicular to the first direction and the second direction, a commodity material toward the at least one primary flow horizontal auger, by a longitudinally oriented conveyor belt disposed along a floor of the delivery box.

* * * * *